United States Patent
Wennersten et al.

(10) Patent No.: US 8,270,736 B2
(45) Date of Patent: Sep. 18, 2012

(54) DEPTH BUFFER COMPRESSION

(75) Inventors: Per Wennersten, Arsta (SE); Jacob Strom, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 373 days.

(21) Appl. No.: 12/677,615

(22) PCT Filed: Sep. 12, 2008

(86) PCT No.: PCT/SE2008/051027
§ 371 (c)(1),
(2), (4) Date: Mar. 11, 2010

(87) PCT Pub. No.: WO2009/035410
PCT Pub. Date: Mar. 19, 2009

(65) Prior Publication Data
US 2010/0254621 A1    Oct. 7, 2010

Related U.S. Application Data

(60) Provisional application No. 60/971,692, filed on Sep. 12, 2007.

(51) Int. Cl.
*G06K 9/36* (2006.01)
*G06K 9/46* (2006.01)
(52) U.S. Cl. ........................ 382/232; 382/244
(58) Field of Classification Search .............. None
See application file for complete search history.

(56) References Cited

U.S. PATENT DOCUMENTS
5,021,891 A * 6/1991 Lee ............................. 382/250
(Continued)

FOREIGN PATENT DOCUMENTS
WO    9715146 A1    4/1997

OTHER PUBLICATIONS

Hasselgren, J. et al., "Efficient Depth Buffer Compression", Graphics Hardware 2006 Conference, Vienna, Austria, Sep. 3, 2006, pp. 1-8.

(Continued)

*Primary Examiner* — Li Liu
(74) *Attorney, Agent, or Firm* — Rothwell, Figg, Ernst & Manbeck, P.C.

(57) ABSTRACT

Device, computer readable medium, and method for selecting compression modes to be applied in a depth buffer (20). The method includes obtaining values corresponding to a tile (30) of the depth buffer (20), selecting a first compression mode (34) from a first plurality of compression modes, compressing the values of the tile (30), writing the compressed values into a first block, based on the first mode (34), and using a preset number of primary bits (34) to store information related to at least one of the first mode (34) and a compression size of the first block, selecting a set of secondary compression modes (32) from a second plurality of compression modes, determining a number of sub-tiles (28), that make up the tile (30), compressing values of the sub-tiles, writing the compressed values into a second block, based on the set of secondary modes (32), and using the same preset number of primary bits (34) to store information related to at least one of the set of secondary modes (32) and a compression size of the second block, comparing the compression size of the tile (30) to the compression size of the sub-tiles (28), choosing the first mode (34) or the set of secondary modes (32) and a corresponding tile size based on a result of the comparing, and storing the selected compressed tile or sub-tiles into the depth buffer (20) and writing into the preset number of primary bits (34) information related to the chosen first mode (34) or set of secondary compression modes (32) or a corresponding size.

32 Claims, 7 Drawing Sheets

U.S. PATENT DOCUMENTS

| | | | |
|---|---|---|---|
| 6,630,933 | B1 | 10/2003 | Van Hook |
| 6,961,057 | B1* | 11/2005 | Van Dyke et al. ............ 345/422 |
| 7,277,098 | B2* | 10/2007 | Xu et al. ...................... 345/555 |
| 2006/0209078 | A1* | 9/2006 | Anderson et al. ............. 345/506 |
| 2008/0273033 | A1* | 11/2008 | Brennan ....................... 345/422 |

OTHER PUBLICATIONS

Cheng-Hsien Chen et al., "Two-level Hierarchical Z-buffer with Compression Technique for 3D Graphics Hardware", Visual Computer, Springer-Verlag, Germany, vol. 19, No. No. 7-8, Dec. 2003, pp. 467-479.

Rasmusson, J., et al. "Exact and Error-bounded Approximate Color Buffer Compression and Decompression" Proceedings of the 22nd ACM Siggraph/Eurographics Symposium, Aug. 4, 2007-Aug. 5, 2007, San Diego, CA, pp. 1-9.

International Search Report issued in PCT/SE2008/051027 on Apr. 24, 2009, 3 pages.

* cited by examiner

DEPTH BUFFER COMPRESSION

CROSS-REFERENCE TO RELATED APPLICATIONS

This application is a 35 U.S.C. §371 National Phase Application from PCT/SE2008/051027, filed Sep. 12, 2008, and designating the United States, and claims priority to Provisional Application No. 60/971,692, filed Sep. 12, 2007. The above-mentioned applications are incorporated by reference herein.

TECHNICAL FIELD

The present invention generally relates to selecting compression modes for compressing data, and more specifically, to methods and devices for achieving multi-tile based compression of depth buffer image data.

BACKGROUND

The demand for processing three-dimensional graphics on mobile communication devices is increasing. Real-time rendering of three-dimensional graphics has a number of appealing applications, such as video games, man-machine interfaces, messaging and m-commerce. Users of communication devices prefer to visualize the objects that they interact with and thus, three-dimensional graphics becomes a feature desired for such communication devices. However, three-dimensional rendering is a computationally expensive task because it requires advanced processing and extensive use of memory. Thus, dedicated hardware is often necessary to reach sufficient performance for rendering the three-dimensional graphics with desired speed and quality. Communication devices, specifically mobile communication devices such as mobile phones, personal digital assistants, video and still cameras are known to be limited in terms of hardware capabilities, i.e., processor power and memory space. In addition, there is a trend to miniaturize the communication devices, which further tolls the advanced processing and memory requirements necessary for three-dimensional rendering. One of the main bottlenecks for these communication devices, especially for mobile phones and game consoles, is memory bandwidth.

A technique for reducing memory bandwidth usage is depth buffer compression. Depth buffer compression is related to the management of image depth coordinates in three-dimensional (3-D) graphics, which is performed in hardware, software or a combination thereof. The depth buffer is one of the solutions to the visibility problem, which is the problem of deciding which elements of a rendered scene are visible, and which are hidden. Depth buffering is also known as Z-buffering. When an object is rendered, the depth of a generated pixel (z coordinate) is stored in a buffer (the depth buffer). This buffer is usually arranged as a two-dimensional array (x-y) with one element for each screen pixel. If another object of the scene is later rendered in the same pixel, the depth of the new object is compared to the one stored in the z-buffer. The new object is only rendered to the pixel, and its depth value is only written to the z-buffer if the new object is closer, i.e., if its depth in the pixel is smaller than the stored value. In the end, the depth buffer allows correct reproduction of usual depth perception: a close object hides a farther one. The depth buffer may be stored on-chip or at an off-chip location, for example an external memory.

In more detail, the rendering of a 3D image is based on primitives, for example triangles, which are drawn in a non-sorted order. There is a need to prevent triangles further back from being drawn on top of triangles in front of them that have been drawn earlier, and this is why the depth buffer is introduced. The depth buffer holds, for each pixel, the depth (distance to the eye) for that particular pixel. Before writing a new pixel, the corresponding depth is first read from the depth buffer. The new pixel is only written to the image if the new depth is smaller than the previously written depth stored in the depth buffer. If the image was updated, the new depth value is then written to the depth buffer. The reading and writing of depth values generate numerous memory accesses. Since the depth buffer is often too big to fit on-chip, these memory accesses will be external (off-chip) accesses. Such memory accesses are often slow, which means that depth buffer accesses can slow down the performance of the device overall. Off-chip memory accesses are also costly in terms of energy consumption, which means that depth buffer accesses also has a potential of draining the battery of hand-held devices.

Most graphics systems, irrespectively if they use depth buffer compression or not, divide the depth buffer into tiles. Rasterization of a primitive is then often performed on a per-tile basis, meaning that all pixels in one tile are processed before processing any pixel in another tile. This means that all depth values for a certain tile can be read in at once using a fast "burst-type" memory access, a fast memory access or other access as would be appreciated by one skilled in the art. During processing of the tile, its depth values are typically stored in an on-chip cache, where they can be accessed without the penalty of an off-chip access. After the tile has been processed, the depth values can be written back from the cache to the external memory, again using a fast burst memory access. However, even though memory accesses are now faster due to bursting, they may still be too slow to reach sufficient performance. Also note that tiling and bursting does not decrease the amount of data that is transmitted over the bus between the GPU and the external memory.

Depth buffer compression addresses this problem by compressing the data in the depth buffer tile before it is written to the external memory. The information is then sent from the chip over the bus, in compressed form, and is also stored in compressed form in the external memory. When the depth values in a tile are needed again at a later stage, the compressed version of the block is read from the external memory and sent over the bus to the chip for processing. After this, the data may be decompressed before being stored in the cache in uncompressed form, and the processing can then take place in the chip. After processing this data, the block is yet again compressed in the chip before being sent from the cache to the external memory. Because this cycle of decompression and compression may happen several times for a particular tile, it is desired that the compression is lossless, i.e., non-destructive. The downside to this is that it is impossible to guarantee any compression at all for losslessly stored data. Thus, it is necessary to also have the capability to store the tile in a non-compressed form.

Another desired feature when rendering three-dimensional graphics is random access to needed tiles. One way to solve this is to reserve a large enough number of bits for each tile so that the tile can be stored non-compressed. In this situation, if a particular tile can be compressed to 50% of the original size, only half of the reserved storage is used for that particular tile. A flag stored on-chip may be used to indicate whether the tile is compressed or non-compressed in the depth buffer. Alternatively, this flag may be stored in the external memory but cached on-chip.

The features and techniques described above are equivalent to data expansion and not compression because the same number of bits is reserved for the compressed mode as for the non-compressed mode and, in addition, more bits are necessary for the flags. However, when transporting a tile between the external memory and the on-chip cache the smaller, compressed, size can be used. Thus, although memory storage is not reduced, memory bandwidth usage is.

In the past, many methods have been used for depth buffer compression, including plane encoding and depth offset encoding. The first technique assumes that a tile is completely covered by one or two triangles. Since depth values emanating from the same triangle will be co-planar, such depth values can efficiently be encoded as planes. For tiles where this works, high compression is possible, but not all tiles can be compressed in this manner. Another method is depth offset compression, which encodes one or more base values, and stores per-pixel offsets from these values. The compression ratios achieved by this method are not as good as those of the plane encoding, but more tiles can be compressed. These two methods are described in more detail in J. Hasselgren and T. Akenine-Möller, "Efficient Depth Buffer Compression," In Proc. Graphics Hardware (2006), pp 103-110, the entire content of which is incorporated herein by reference.

These compression schemes work for tiles of 4×4 depth values, especially when the used architecture allows for both plane encoding and depth offset to be combined, resulting thus in some compression for most tiles and high compression for some tiles. The problem with this approach is that for larger tile sizes, such as 8×8 depth values, the average compression ratio decreases. This decrease is despite the fact that a larger tile size should allow for better utilization of spatial redundancy, and indeed, the 8×8 plane encoding methods achieve better compression ratios for the blocks which they can compress. A reason for the decrease in performance is the simple plane assumptions made: 8×8 tiles are seldom covered by a single triangle. More complex methods suitable for multiple triangles may be too costly to implement. In other words, an architecture designed to efficiently compress 4×4 tiles is not as efficient when compressing 8×8 tiles. Additionally, the tile size affects far more than just depth buffer compression, and so it is not simply a matter of selecting the tile size which leads to the best compression ratios.

Accordingly, it would be desirable to provide devices, systems and methods for controlling a compression of the depth buffer that avoid the afore-described problems and drawbacks.

SUMMARY

According to an exemplary embodiment, there is a method for selecting compression modes to be applied in a depth buffer. The method includes obtaining values corresponding to a tile of the depth buffer; selecting a first compression mode from a first plurality of compression modes; compressing the values of the tile, writing the compressed values into a first block, based on the first mode, and using a preset number of primary bits to store information related to at least one of the first mode and a compression size of the first block; selecting a set of secondary compression modes from a second plurality of compression modes; determining a number of sub-tiles, that make up the tile, compressing values of the sub-tiles, writing the compressed values into a second block, based on the set of secondary compression modes, and using the same preset number of primary bits to store information related to at least one of the set of secondary compression modes and a compression size of the second block; comparing the compression size of the tile to the compression size of the sub-tiles; choosing the first mode or the set of secondary modes and a corresponding tile size based on a result of the comparing; and storing the selected compressed tile or sub-tiles into the depth buffer and writing into the preset number of primary bits information related to the chosen first mode or set of secondary compression modes or a corresponding size.

According to another exemplary embodiment, there is a device for selecting compression modes to be applied in a depth buffer. The device includes an input configured to obtain values corresponding to a tile of the depth buffer and a processor. The processor is configured to select a first compression mode from a first plurality of compression modes, compress the values of the tile, write the compressed values into a first block, based on the first mode and use a preset number of primary bits for storing information related to at least one of the first mode and a compression size of the first block, select a set of secondary compression modes from a second plurality of compression modes, determine a number of sub-tiles, that make up the tile, compress write the compressed values of the sub-tiles into a second block, based on the set of secondary compression modes, and use the same preset number of primary bits for storing information related to at least one of the set of secondary compression modes and a compression size of the second block, compare the compression size of the tile to the compression size of the sub-tiles, and chose the first mode or the set of secondary modes and a corresponding tile size based on a result of the comparing. The device also includes a depth buffer that is configured to store the preset number of primary bits that are related to the chosen first mode or the set of secondary compression modes or the corresponding tile size.

According to still another exemplary embodiment, there is a computer readable medium storing computer executable instructions, wherein the instructions, when executed by a processor, cause the processor to select compression modes to be applied in a depth buffer. The instructions include obtaining values corresponding to a tile of the depth buffer, selecting a first compression mode from a first plurality of compression modes, compressing the values of the tile, writing the compressed values into a first block, based on the first set and using a preset number of primary bits for storing information related to at least one of the first mode and a compression size of the first block, selecting a set of secondary compression modes from a second plurality of compression modes, determining a number of sub-tiles, that make up the tile, compressing values of the sub-tiles, writing the compressed values into a second block, based on the set of secondary compression modes, and using the same preset number of primary bits for storing information related to at least one of the set of secondary compression modes and a compression size of the second block, comparing the compression size of the tile to the compression size of the sub-tiles, choosing the first mode or the set of secondary modes and a corresponding tile size based on a result of the comparing, and storing the selected compressed tile or sub-tiles into the depth buffer and writing into the present number of primary bits information related to the chosen first mode or the set of secondary compression modes or a corresponding size.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to 4×4 and 8×8 tiles. However, the embodiments discussed next are not limited to these two tile sizes but may be applied to other tile sizes as would be recognized by one skilled in the art. In this regard, it is also noted that the selected tile does not have to be square, it may have different shapes. Thus, a depth buffer may hold information regarding an image and the depth buffer may be divided in display regions. Each display region may be divided in display subregions. A unit for the display regions or display subregions is a display block. In an exemplary embodiment, the display region corresponds to an 8×8 tile, the display subregion corresponds to an 4×4 tile, and the display block may be a pixel.

Reference throughout the specification to "one embodiment" or "an embodiment" means that a particular feature, structure, or characteristic described in connection with an embodiment is included in at least one embodiment of the present invention. Thus, the appearances of the phrases "in one embodiment" or "in an embodiment" in various places throughout the specification are not necessarily all referring to the same embodiment. Further, the particular features, structures or characteristics may be combined in any suitable manner in one or more embodiments.

Figure 1:
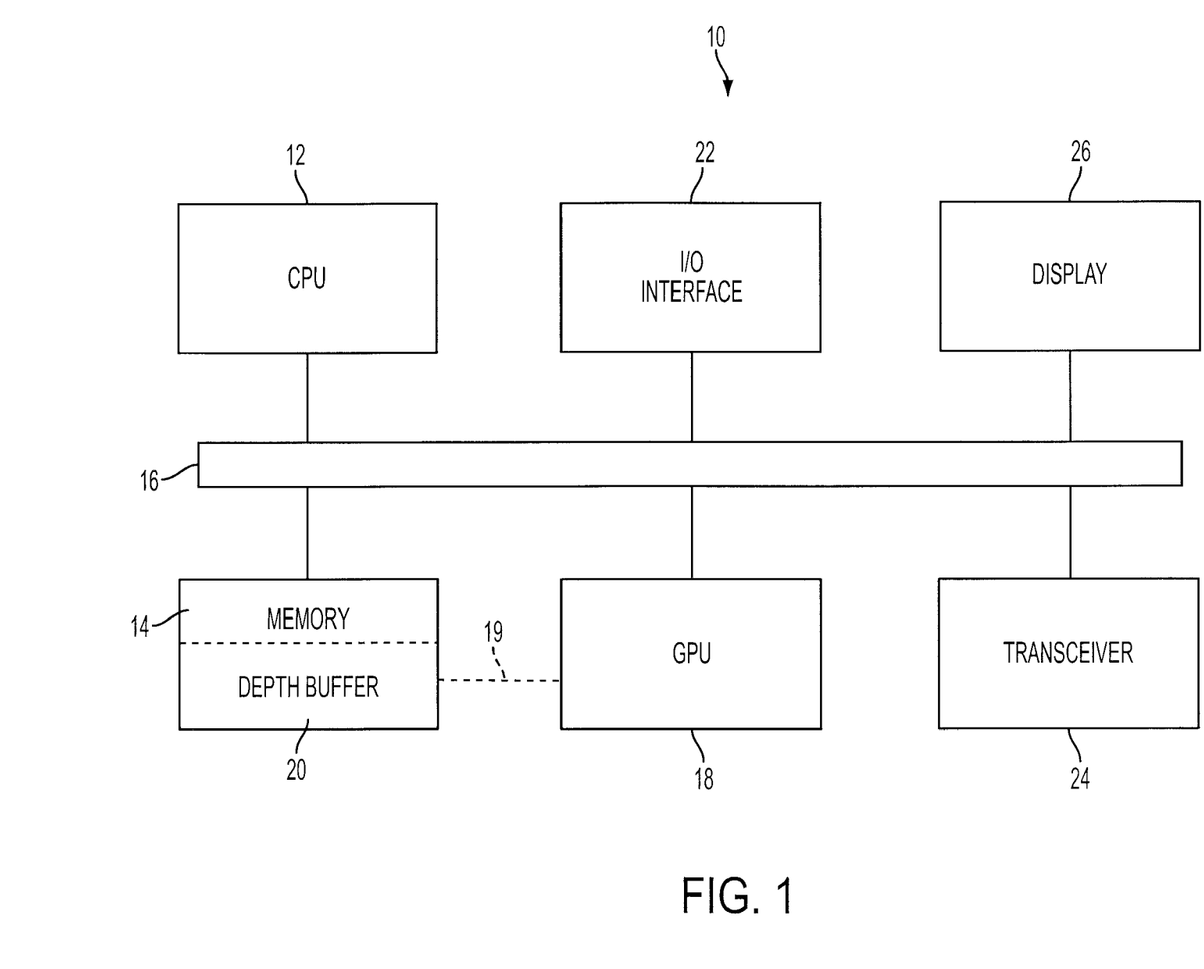
FIG. 1 is a schematic diagram of device that selects a compression mode according to an exemplary embodiment.

As shown in FIG. 1, according to an exemplary embodiment, a communication device 10 includes a processor 12 connected to a memory 14 via a bus 16. The processor is configured to perform various functions associated with compressing and decompressing video data. The processor 12 may include one or more processor for parallel processing and also a memory (not shown) for the on-chip cache. The memory 14 is configured to store the data and various instructions required or produced by the processor 12. A depth buffer 20 may be part of the memory 14 and is configured for storing data associated with a depth of each pixel to be represented on a display. A graphic processor unit (GPU) 18 may be provided for rendering three-dimensional graphics. The graphic processor 18 may read data directly from the depth buffer 20 via a dedicated bus 19. The communication device 10 may include an input/output interface 22, a transceiver 24 or other connection port for communicating with other communicant devices or a network. The communication may be over a wire line or a wireless interface. The communication device may include a display 26 on which the three-dimensional graphics is rendered. In an alternate embodiment, the depth buffer may be stored in another memory (not shown) which may not be connected to the bus 16. Instead, another bus (not shown) may connect this memory with the GPU. The display 26 may also be connected to this alternate bus instead of bus 16.

According to an exemplary embodiment, the GPU attempts to encode an 8×8 tile as a whole, and if that fails or it is more economical to use another size for the tile, the processor divides the 8×8 tile into four 4×4 tiles and compresses the 4×4 tiles separately. For clarity, it is understood in this description that an n×n tile describes that $n^2$ number of display blocks (pixels for example) are present in the n×n tile and not that the image buffer includes $n^2$ tiles. The type of compression used for each 4×4 sub-tile may be stored or cached on-chip using a number of bits for each sub-tile. Combinations of compressions for the 4×4 sub-tiles that are not occurring very often may be discarded and the available bit-combinations may be used to indicate an 8×8 compression scheme. This number of combinations depends on the implementation. In one exemplary embodiment, the number of combinations discarded is two. This technique leads to compression ratios better than what pure 4×4-schemes would achieve and also better than pure 8×8-schemes. According to another exemplary embodiment, an 8×8 tile is compressed, then, irrespective of the output of the compression, the 8×8 tile is split into four 4×4 tiles, the corresponding 4×4 tiles are compressed, and a final compression is selected after comparing the 8×8 compression with the 4×4 compression and deciding which compression is more efficient. Furthermore, the encoding of the 4×4 tiles and 8×8 tiles may be performed simultaneously or in any desired order. In another exemplary embodiment, a device that is programmed to use depth buffer compression is hardwired to receive as input one type of tiles (e.g., the 4×4 tiles). Thus, this pre-programmed device may not handle 8×8 tiles. However, a device pre-programmed to handle 8×8 tiles may be configured to handle 4×4 tiles. In other words, the type of tiles that is handled by a processor depends on the pre-programmed size of the input and the processor may handle sub-tiles of the pre-programmed tile but not tiles larger than the pre-programmed tile.

Figure 2:
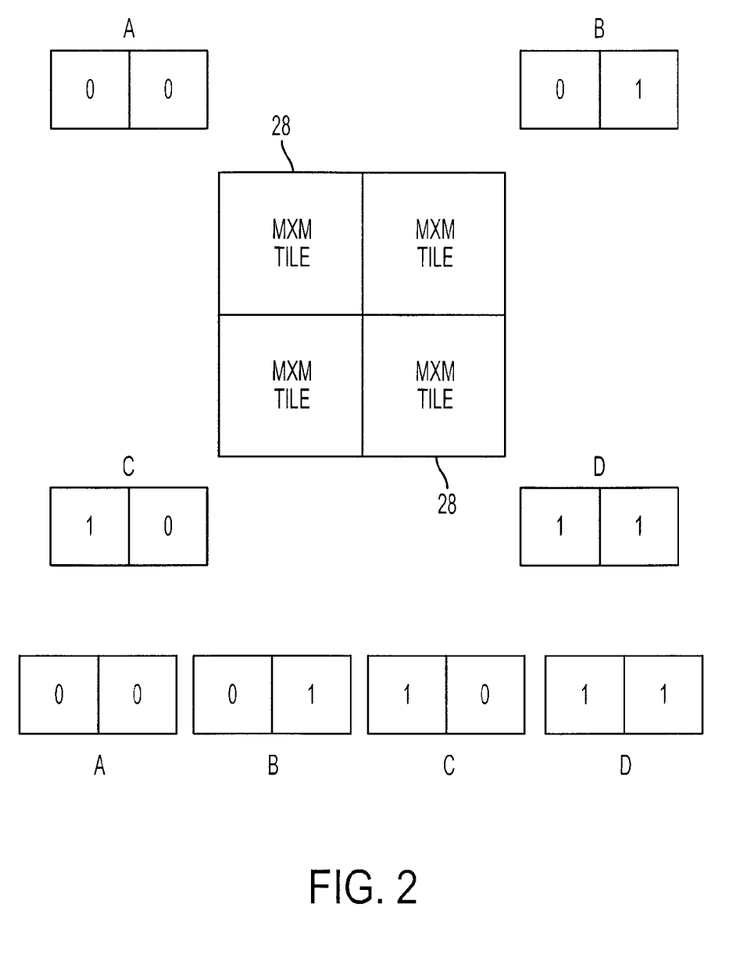
FIG. 2 is a schematic diagram illustrating tiles, sub-tiles, and a preset number of bits for representing applied compression modes according to an exemplary embodiment.

Methods that compress only 4×4 tiles or only 8×8 tiles typically use two bits per tile to specify the compression used. This number of bits allows four different modes, for example 00, 01, 10, and 11. One of the modes corresponds to the uncompressed mode, which is used to achieve lossless compression. The uncompressed mode indicates that no compression has been applied to the respective tile. In this respect, FIG. 2 shows four tiles 28, each having an n×n size and each tile having a corresponding two bits unit A, B, C or D. The values of the two bits units are shown in FIG. 2 as being different, i.e., 00, 01, 10, and 11. Based on these combinations, an 8 bit value is used to specify the compression used for each of the four n×n tiles, for example, any combination of the basic values 00, 01, 10, and 11. A few such examples are 11, 11, 11, 01 or 01, 11, 10, 10.

Another one of the modes is typically reserved for cleared tiles, which allows clearing the entire depth buffer by just setting all of these 2-bit flag values to a predetermined value rather than overwriting all the values in the buffer. This way, the entire depth buffer can be cleared by just accessing the flags that may be stored on-chip, and no accesses to external memory need to be performed. This selection of the uncompressed mode and the cleared tiles mode leaves two more modes for indicating a depth buffer compression. The remaining two modes may be, according to an exemplary embodiment, the plane encoding scheme and the depth offset scheme disclosed in the Efficient Depth Buffer Compression article, discussed above. According to another exemplary embodiment, other modes may be used for depth buffer compression.

In one exemplary embodiment, the encoding of the 8×8 tile is discussed. Eight primary bits (divided into the two-bit vectors A, B, C, and D from FIG. 2) are used per each 8×8 tile, thus bringing the total memory usage on-chip to the same level as for the standard 4×4 schemes. For simplicity of the discussion, the bits stored on-chip are called primary bits and the bits stored in a block that is transmitted between the chip and the external memory are called secondary bits. The block may also include the compressed data regarding the image data. The 8×8 tile may be split into four 4×4 sub-tiles, and the primary eight bits are interpreted as four sets (A, B, C, and D) of two bits, each set specifying the compression used for one 4×4 sub-tile of the 8×8 tile. The data indicating the compression of the tile is now included in four separate parts A to D, and each part is processed individually by compressors and decompressors, identical to the ones used in the 4×4 case.

The four sets A, B, C and D need to describe the compression of the four 4×4 sub-tiles that make up the 8×8 tile if (1) a 4×4 compression is selected, or (2) an 8×8 compression is selected. However, the 4×4 compression requires all possible combinations of the four sets A to D, i.e., $2^k 2^k 2^k 2^k$ combinations in which k is 2 in this exemplary embodiment. Thus, no remaining combination of the four sets of A to D is left when using an 8×8 compression. According to this exemplary embodiment, this problem is solved by allowing a predetermined number of the primary eight-bit values to represent an 8×8 compression algorithm rather than a combination of 4×4 algorithms. The predetermined number is at least one and more preferably is two for this particular example. Then, the $2^k 2^k 2^k 2^k$ possible combinations are split into $2^k 2^k 2^k 2^k - 2$ combinations for indicating 4×4 compressions and 2 combinations for indicating 8×8 compressions. In another exemplary embodiment, the number of combinations may be $2^{k1} 2^{k2} 2^{k3} 2^{k4}$, where k1 to k4 are integer numbers, if the buffer is split into tiles having different numbers of compression modes available. This number of combinations is stored in the primary bits in this exemplary embodiment. According to another exemplary embodiment, the size of the tile is larger than 8×8 and then, more compression modes may be needed. Therefore the number of combinations may be $2^{k1} 2^{k2} 2^{k3} \ldots 2^{kn}$, where n "i" is an integer number larger than 2.

Figure 3:
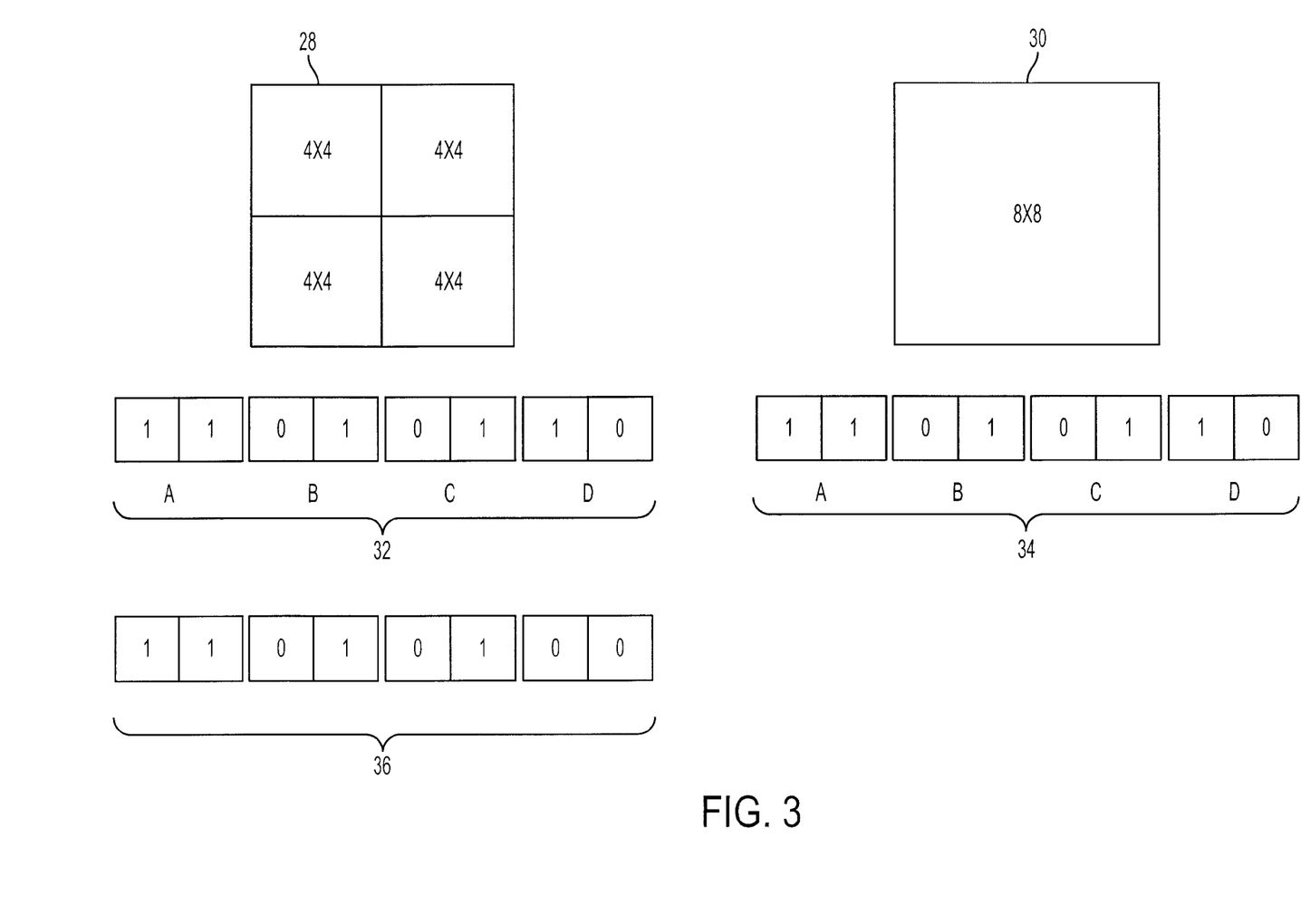
FIG. 3 is a schematic diagram illustrating how the present number of bits is used for tiles and sub-tiles.

The example shown in FIG. 3 is used to illustrate this method. The numbers shown in FIG. 3 are illustrative and not intended to limit the embodiments of the invention. Suppose that an 8×8 tile 30 (i.e., a tile having 64 pixels may be encoded as four 4×4 tiles 28 or as a single 8×8 tile 30. If the tile is encoded using 4×4 tiles, then, one possible combination 32 of encoding is 11, 01, 01, and 10. Suppose that this encoding combination 32 is determined to be the least occurring combination when real tiles are compressed. The frequency of certain combinations is less than the frequency of other combinations as there is a correlation between the pixels in the tiles and thus, not all combinations appear equally when encoding is performed. Those combinations that are least occurring may not be used for 4×4 sub-tiles but only for indicating the compression applied to an 8×8 tile. More specifically, in the context of the example shown in FIG. 3, the combination 32 is not allowed to represent a 4×4 compression but rather an 8×8 compression. That means that when a compressor determines that four 4×4 tiles are compressed as indicated by combination 32, that compression is not allowed and instead one sub-tile (for example corresponding to D) is changed to uncompressed (0,0) as shown in combination 36. This operation is possible as enough memory (either on-chip or external to the chip) is assigned for storing the data corresponding to the image in uncompressed form.

According to this exemplary embodiment, predetermined combinations of 4×4 tiles are not allowed and when occurring, they are modified, for example, changing one sub-tile to be noncompressed. The forbidden combination 32 is used as combination 34 for indicating a compressing mode for the single 8×8 tile. In this way, if both the compressor and decompressor are aware of predetermined combinations that are not allowed for 4×4 compression but allowed for 8×8 compression, the compression of both 4×4 and 8×8 tiles can be achieved with the same primary 8 bit combinations 32 without the need for adding more primary bits. The number of forbidden combinations 32 for the 4×4 compression is determined based on the desired number of 8×8 compression modes, for example two. Thus, both 4×4 and 8×8 compressions may be implemented using the same primary 8-bit set.

The above discussed method may be implemented in hardware by implementing both 8×8 and 4×4 algorithms. In addition, the method requires more on-chip memory than existing 8×8 compression schemes, as the 8×8 compression schemes need only two primary bits to indicate the two compression modes while this method uses 8 primary bits. If the primary bits are expensive, i.e., the space on-chip is limited, the increased number of primary bits to 8 may be a problem. This could be partially remedied by letting the mode be dependent not only on the flag bits (primary bits), but also on information stored in the actual block (secondary bits) that is transferred between the chip and the external memory.

According to another exemplary embodiment, a method for compressing and decompressing image data in a depth buffer which uses less primary bits is discussed. In this exemplary embodiment, the number of primary bits is reduced relative to the previous embodiment and secondary bits are used to account for the reduced number of primary bits. For a best understanding of this embodiment, a particular example is provided. However, this particular example is not intended to limit the invention but only to clarify it. The size of the compressed blocks may always be divisible by, for example, 128. An uncompressed tile may include for example 24 times 8 times 8=1536 bits if 24 bits are necessary for a pixel, and there are 8 times 8 pixels in a tile. Thus, if the size of the compressed tile is divisible by 128, the possible sizes would be 0, 128, 256, 384, . . . , 1536 bits. Then, there would be 13 possible sizes for the compressed 8×8 tile and a four-bit value may be suitable to describe the 13 sizes as the four-bit value may hold 16 different values. By storing, for example, the four-bits as a primary four-bit value on-chip, to specify the size of the compressed tile, the correct amount of memory can be transferred over the bus.

However, in order to maintain the primary bits at a reduced level (as they are expensive to be stored on-chip) and to be able to decompress the tile, the 8 bits of information (primary bits in the previous embodiment and secondary bits in this embodiment) indicating which compression algorithms were used need to be stored and transferred together with the compressed data instead of storing them on-chip. This means that the real block (i.e., information containing the compressed image data) sizes are 8, 136, 264, 392, . . . , 1542 bits, i.e., extra 8 bits are added to each block. However, for the smallest block size, all sub-blocks must be cleared, and thus the bit combination for this size is known. Thus, there is no need to store that information in the block. Also, for the largest block size, all sub-blocks are "not compressed," so in this case there is also no need to store any extra bits along with the compressed block. Thus, the 13 sizes may be 0, 136, 264, 392, 520, 648, 776, 904, 1032, 1160, 1288, 1416, and 1536 bits.

According to this exemplary embodiment, the primary bits (which are not limited to four) are stored on-chip and they indicate the size of the blocks exchanged between the chip and the external memory and the secondary bits (which are not limited to eight) are stored off-chip, i.e., in an external memory for example, and they contain any extra information needed to indicate a combination of compression modes for the sub-tiles or a single compression mode for the entire tile.

Furthermore, on a 64 bit bus it may be as cheap to fetch 192 (64×3) bits as to fetch 136 bits. In such a case, the sizes may instead be selected to be 0, 192, 320, 448, 576, 704, 832, 960, 1088, 1216, 1344, 1472, 1536, and the 56 extra bits can be divided among the 4×4 compression modes, for instance using 14 extra bits in every mode. Since the primary four flag bits can signal 16 different modes, and only 13 are used, one or more of the remaining modes can signal an 8×8 mode, in an alternate embodiment. This way, no combinations need to be disallowed in the 4×4 mode. In yet an alternate embodiment, the primary flag bits can be used to distinguish between some modes of different size, but further bits stored in the tiles are sometimes needed to determine the exact mode. For instance, the primary flag bit can indicate two types of tiles of size 768. For one of the types, no extra bits are necessary to know what mode it is. For the other type, one extra bit stored in the block may differentiate between two different modes.

According to an exemplary embodiment, the 4×4 compression modes may be (1) uncompressed, (2) cleared tiles, (3) the two-plane mode of Hasselgren, and (4) the 16-bit depth offset mode also described in Hasselgren.

In an alternate embodiment, the 4×4 compression modes may be (1) uncompressed, (2) the two-plane mode of Hasselgren and (3) the 16-bit depth offset mode also described in Hasselgren. In this way, there are 3×3×3×3=81 combinations of 4×4 compressions and 7 primary flag bits would suffice to describe these compression modes. Note that in this embodiment, a 4×4 tile cannot be cleared, and therefore it may be advantageous to add an 8×8 cleared mode. Note also that, in this embodiment, it is possible to signal several 8×8 modes before running out of the possible 128 combinations provided by the seven flag bits.

According to an exemplary embodiment, two eight-bit values that would correspond to the least used compression modes for four 4×4 sub-tiles are reserved for the two compression modes of one 8×8 tile. In this exemplary embodiment, the two eight-bit values are those that correspond to two sub-tiles being uncompressed, one cleared and one compressed by depth offset. These two eight-bit values are instead used to indicate that the single 8×8 tile has been compressed, for example, with the one or two-planes modes of Hasselgren. Tiles that need to be divided into 4×4 sub-tiles and would be represented by one of those forbidden values may have the sub-tile that would be compressed by depth offset left uncompressed instead.

Figure 4:
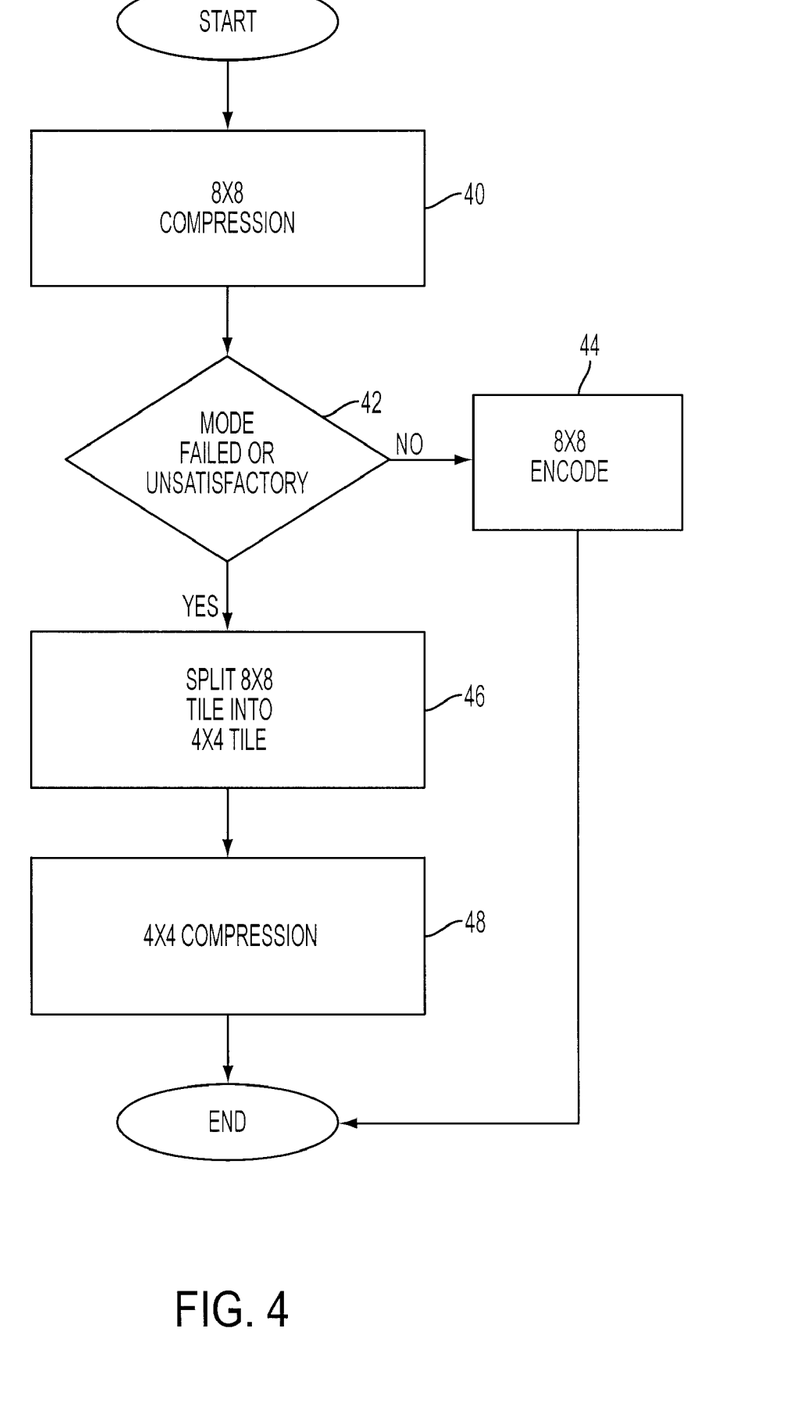
FIG. 4 is a flow chart illustrating steps of a method for selecting compression modes according to an exemplary embodiment.

According to an exemplary embodiment shown in FIG. 4, when a 8×8 tile has to be compressed, an 8×8 compression is applied in step 40. The compression is evaluated in step 42. If the compression is successful, then the 8×8 encoding is performed in step 44 and the process ends. If the compression fails (i.e., a reduction in the number of bits used is not achieved) or the compression is not satisfactory for other reasons, the 8×8 tile is split into four 4×4 tiles in step 46 and a 4×4 compression is applied in step 48. After this step the compression process for the initial tile ends.

Figure 5:
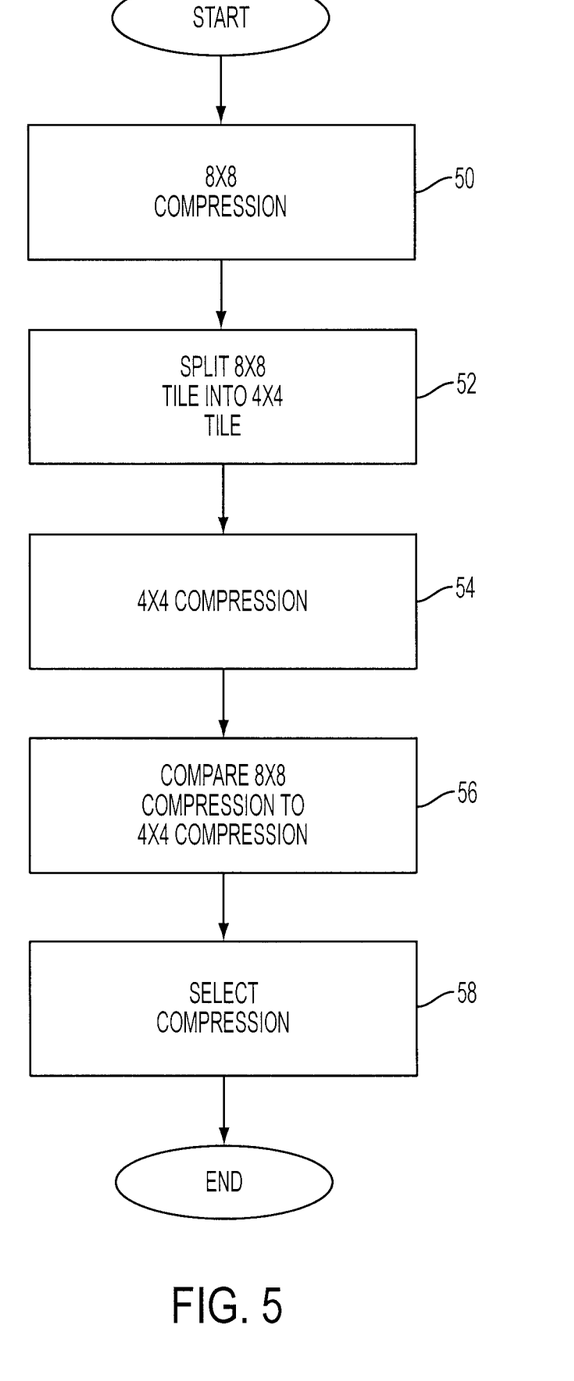
FIG. 5 is a flow chart illustrating steps of a method for selecting compression modes according to another exemplary embodiment.

According to another embodiment shown in FIG. 5, an initial 8×8 tile is compressed in step 50 using an 8×8 mode. Then, the tile is split in step 52 into four 4×4 tiles and each tile is compressed in step 54 using 4×4 modes. The order of steps 50 and 54 may be reversed or both steps 50 and 54 may be performed in parallel. The efficiency of the two compressions is compared in step 56 and in step 58 the actual compression is selected based on the more efficient compression.

Figure 6:
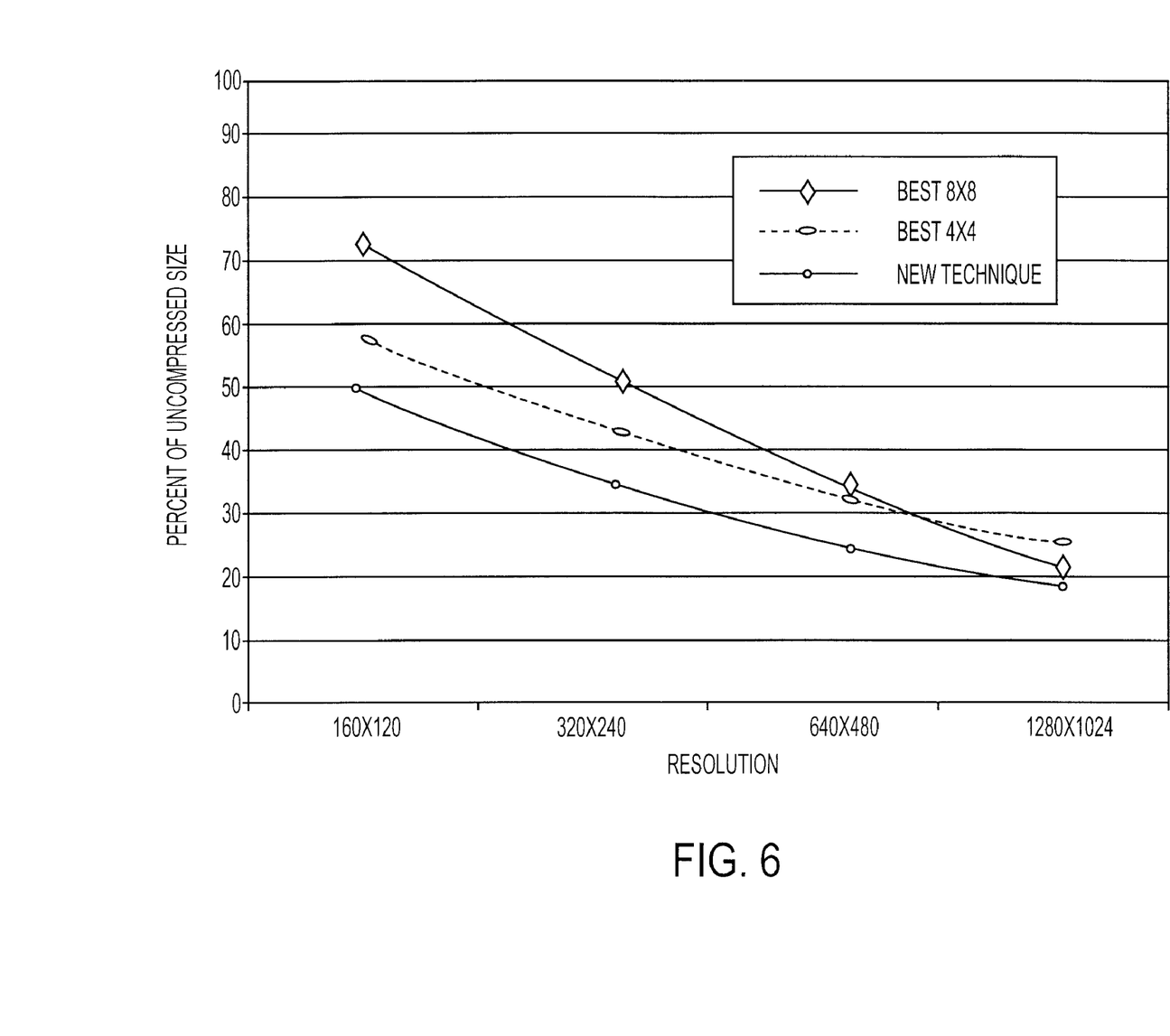
FIG. 6 is a graph illustrating the results of various compression techniques according to an exemplary embodiment.

In this regard, FIG. 6 shows that this exemplary method achieves a better compression than both the pure 4×4 compression and the pure 8×8 compression. The tests shown in FIG. 6 were made on a simple test-scene, and the tests were made at varying resolutions. Varying the resolution amounts to changing the average amount of triangles per tile, and should be similar to changing the complexity of the scene being rendered. The results of FIG. 6 show that the novel technique is about 15-30% better than existing techniques, regardless of scene complexity.

Figure 7:
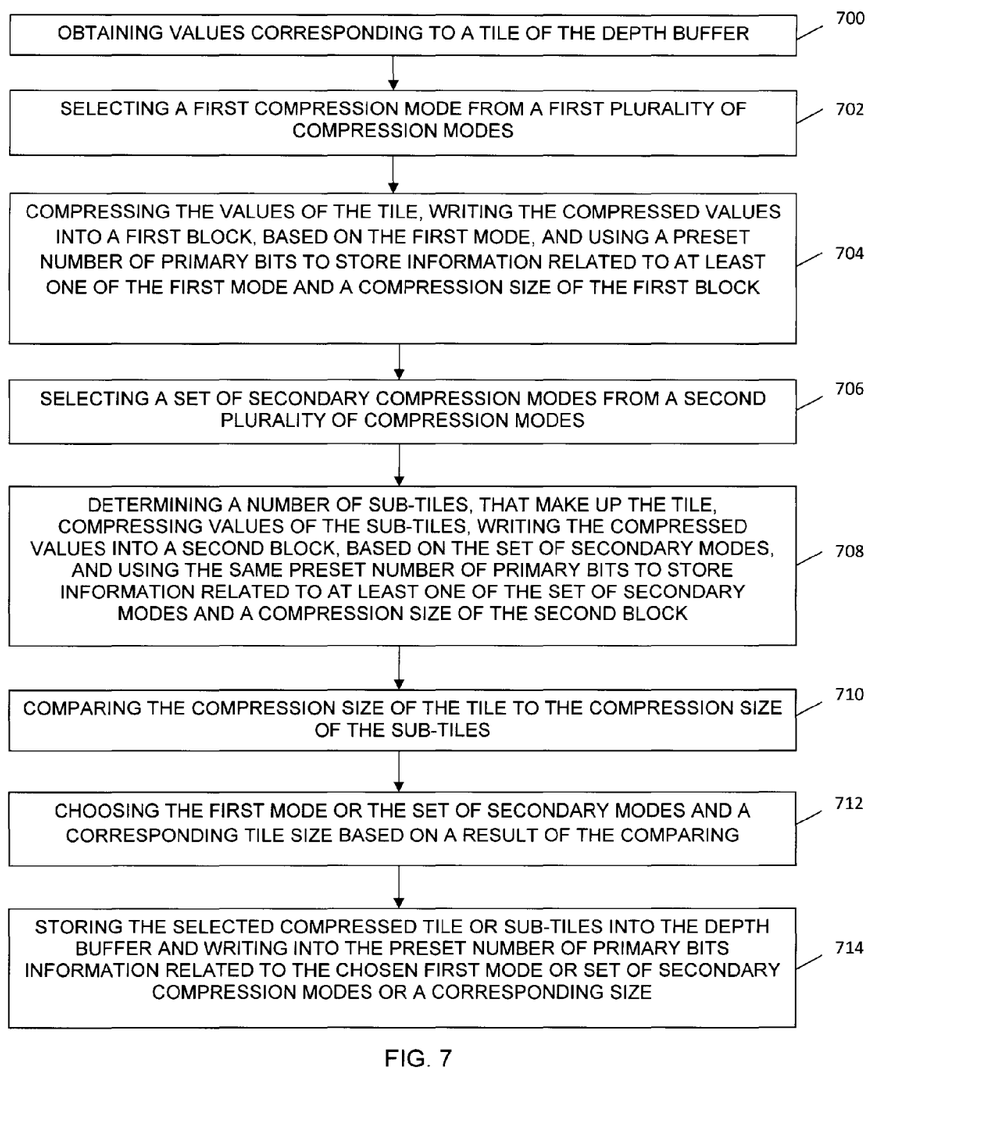
FIG. 7 is a flow diagram illustrating steps of a method for selecting compression modes according to yet another exemplary embodiment.

According to an exemplary embodiment shown in FIG. 7, there is a method for selecting compression modes to be applied in a depth buffer. The method includes a step 700 of obtaining values corresponding to a tile of the depth buffer, a step 702 of selecting a first compression mode from a first plurality of compression modes, a step 704 of compressing the values of the tile, writing the compressed values into a first block, based on the first mode, and using a preset number of primary bits to store information related to at least one of the first mode and a compression size of the first block, a step 706 of selecting a set of secondary compression modes from a second plurality of compression modes, a step 708 of determining a number of sub-tiles, that make up the tile, compressing values of the sub-tiles, writing the compressed values into a second block, based on the set of secondary compression modes, and using the same preset number of primary bits to store information related to at least one of the set of secondary compression modes and a compression size of the second block, a step 710 of comparing the compression size of the tile to the compression size of the sub-tiles, a step 712 of choosing the first mode or the set of secondary modes and a corresponding tile size based on a result of the comparing, and a step 714 of storing the selected compressed tile or sub-tiles into the depth buffer and writing into the preset number of primary bits information related to the chosen first mode or set of secondary compression modes or a corresponding size.

Thus, at least one method discussed above, reduces bandwidth usage by compressing the data exchanged, which results in not only reducing the risk of memory traffic acting as a performance bottleneck, but also reduces power consumption and heat generation in the device, which is especially useful for mobile devices and other battery powered devices.

The disclosed exemplary embodiments provide a device, method and a computer program product for selecting compression modes to be applied in a depth buffer or similar devices. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

As also will be appreciated by one skilled in the art, the exemplary embodiments may be embodied in a wireless communication device, a computer system, as a method or in a computer program product. The exemplary embodiments may alternatively be embodied in another battery-powered device, such as a hand-held game console, or in a network-powered device, such as a PC or a stationary game console. Accordingly, the exemplary embodiments may take the form of an entirely hardware embodiment or an embodiment combining hardware and software aspects. Further, the exemplary embodiments may take the form of a computer program product stored on a computer-readable storage medium having computer-readable instructions embodied in the medium. Any suitable computer readable medium may be utilized including hard disks, CD-ROMs, digital versatile disc (DVD), optical storage devices, or magnetic storage devices such a floppy disk or magnetic tape. Other non-limiting examples of computer readable media include flash-type memories or other known memories.

The exemplary embodiments may also be implemented in an application specific integrated circuit (ASIC), or a digital signal processor. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. A processor in association with software may be used to implement a radio frequency transceiver for use in the user terminal, the base station or any host computer. The user terminal may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

Although the features and elements of the present exemplary embodiments are described in the embodiments in particular combinations, each feature or element can be used alone without the other features and elements of the embodiments or in various combinations with or without other features and elements disclosed herein. The methods or flow charts provided in the present application may be implemented in a computer program, software, or firmware tangibly embodied in a computer-readable storage medium for execution by a general purpose computer or a processor.

What is claim is:

1. A method for selecting compression modes to be applied in a depth buffer, the method comprising:

obtaining values corresponding to a tile of the depth buffer;

selecting a first compression mode from a first plurality of compression modes;

compressing the values of the tile, writing the compressed values into a first block, based on the first mode, and using a preset number of primary bits to store information related to at least one of the first mode and a compression size of the first block;

selecting a set of secondary compression modes from a second plurality of compression modes;

determining a number of sub-tiles, that make up the tile, compressing values of the sub-tiles, writing the compressed values into a second block, based on the set of secondary compression modes, and using the same preset number of primary bits to store information related to at least one of the set of secondary compression modes and a compression size of the second block;

comparing the compression size of the first block to the compression size of the second block;

choosing the first mode or the set of secondary modes and a corresponding tile size based on a result of the comparing; and storing the selected compressed tile or sub-tiles into the depth buffer and writing into the preset number of primary bits information related to the chosen first mode or set of secondary compression modes or a corresponding size.

2. The method of claim 1, wherein each sub-tile includes 4×4 pixels and the tile includes 8×8 pixels.

3. The method of claim 1, wherein the preset number of primary bits is 4 or 8.

4. The method of claim 1, wherein the second plurality of compression modes includes uncompressed, cleared, two-plane, and depth offset modes.

5. The method of claim 1, wherein the preset number of primary bits is enough to represent only certain combinations of compressing modes corresponding to the sub-tiles.

6. The method of claim 1, wherein the first plurality of compression modes includes one-plane and two-plane modes.

7. The method of claim 1, further comprising:

assigning k sets of values for the preset number of primary bits for indicating the compression mode of the tiles and $2^{k_1}2^{k_2}2^{k_3} \ldots 2^{k_n}$–k sets of values for the preset number of primary bits for indicating the compression modes of the sub-tiles, where k, k1, k2, k3, kn, and n are integer numbers.

8. The method of claim 1, further comprising:

preventing combinations of compression modes of the sub-tiles that correspond to the combinations that have the fewest occurrences; and assigning the bit-combinations representing these combinations to instead represent compression modes of the entire tile.

9. The method of claim 8, wherein the prevented combinations of compression modes of the sub-tiles are modified, when occurring, by changing one compression mode in each prevented combination to another mode.

10. The method of claim 1, wherein the result of the comparing is associated with the largest percentage of compression of the tile and sub-tiles.

11. The method of claim 1, wherein each step is performed by a processor.

12. The method of claim 11, wherein the preset number of primary bits is stored in the processor.

13. The method of claim 1, further comprising:

storing in the preset number of primary bits the size of the first or second compressed blocks.

14. The method of claim 1, further comprising:

storing in a preset number of secondary bits, which is different from the preset number of primary bits, information related to the chosen first mode or set of secondary compression modes.

15. The method of claim 14, wherein the preset number of secondary bits is stored in at least one of the first and second compressed blocks.

16. The method of claim 14, wherein the preset number of primary bits is stored in a processor and the preset number of secondary bits is stored in a memory external to the processor.

17. A device for selecting compression modes to be applied in a depth buffer, the device comprising:
- an input configured to obtain values corresponding to a tile of the depth buffer;
- a processor configured to
  - select a first compression mode from a first plurality of compression modes,
  - compress the values of the tile, write the compressed values into a first block, based on the first mode and use a preset number of primary bits for storing information related to at least one of the first mode and a compression size of the first block,
  - select a set of secondary compression modes from a second plurality of compression modes,
  - determine a number of sub-tiles, that make up the tile, compress write the compressed values of the sub-tiles into a second block, based on the set of secondary compression modes, and use the same preset number of primary bits for storing information related to at least one of the set of secondary compression modes and a compression size of the second block,
  - compare the compression size of the first block to the compression size of the second block, and
  - chose the first mode or the set of secondary modes and a corresponding tile size based on a result of the comparing; and
- the depth buffer being configured to store the preset number of primary bits that are related to the chosen first mode or the set of secondary compression modes or the corresponding tile size.

18. The device of claim 17, wherein each sub-tile includes 4×4 pixels and the tile includes 8×8 pixels.

19. The device of claim 17, wherein the preset number of primary bits is 4 or 8.

20. The device of claim 17, wherein the second plurality of compression modes includes uncompressed, cleared, two-plane, and depth offset modes.

21. The device of claim 17, wherein the preset number of primary bits is enough to represent only combinations of compressing modes corresponding to the sub-tiles.

22. The device of claim 17, wherein the first plurality of compression modes includes one-plane and two-plane modes.

23. The device of claim 17, wherein the processor is further configured to:
- assign k sets of values for the preset number of primary bits for indicating the compression mode of the tiles and $2^{k1}2^{k2}2^{k3} \ldots 2^{kn}$ –k sets of values for the preset number of primary bits for indicating the compression modes of the sub-tiles, where k, k1, k2, k3, k4, and n are integer numbers.

24. The device of claim 17, wherein the processor is further configured to:
- prevent combinations of compression modes of the sub-tiles that correspond to two combinations that have the lowest occurrences; and
- assign the two combinations to compression modes of the tiles.

25. The device of claim 24, wherein the processor is further configured to:
- modify, when occurring, the prevented combinations of compression modes of the sub-tiles by changing one compression mode in each prevented combination to an uncompressed mode.

26. The device of claim 24, wherein the result of the comparing is associated with the largest percentage of compression of the tile and sub-tiles.

27. The device of claim 17, wherein the preset number of primary bits is stored in the processor.

28. The device of claim 17, wherein the preset number of primary bits stores the size of the first and/or second compressed blocks.

29. The device of claim 17, wherein a preset number of secondary bits, which is different from the present number of primary bits, stores information related to the chosen set of compression modes.

30. The device of claim 29, wherein the preset number of secondary bits is stored in at least one of the first and second compressed blocks.

31. The device of claim 29, further comprising:
- a memory external to the processor,
- wherein the preset number of primary bits is stored in the processor and the preset number of secondary bits is stored in the memory.

32. non-transitory A computer readable medium storing computer executable instructions, wherein the instructions, when executed by a processor, cause the processor to select compression modes to be applied in a depth buffer, the instructions comprising:
- obtaining values corresponding to a tile of the depth buffer;
- selecting a first compression mode from a first plurality of compression modes;
- compressing the values of the tile, writing the compressed values into a first block, based on the first mode and using a preset number of primary bits for storing information related to at least one of the first mode and a compression size of the first block;
- selecting a set of secondary compression modes from a second plurality of compression modes;
- determining a number of sub-tiles, that make up the tile, compressing values of the sub-tiles, writing the compressed values into a second block, based on the set of secondary compression modes, and using the same preset number of primary bits for storing information related to at least one of the set of secondary compression modes and a compression size of the second block;
- comparing the compression size of the first block to the compression size of the second block;
- choosing the first mode or the set of secondary modes and a corresponding tile size based on a result of the comparing; and
- storing the selected compressed tile or sub-tiles into the depth buffer and writing into the present number of primary bits information related to the chosen first mode or the set of secondary compression modes or a corresponding size.

* * * * *

UNITED STATES PATENT AND TRADEMARK OFFICE
CERTIFICATE OF CORRECTION

PATENT NO.       : 8,270,736 B2
APPLICATION NO.  : 12/677615
DATED            : September 18, 2012
INVENTOR(S)      : Wennersten et al.

It is certified that error appears in the above-identified patent and that said Letters Patent is hereby corrected as shown below:

On the Title Page, in Field (75), under "Inventors", in Column 1, Line 1, delete "Arsta" and insert -- Årsta --, therefor.

On the Title Page, in Field (75), under "Inventors", in Column 1, Line 2, delete "Strom," and insert -- Ström, --, therefor.

In Column 13, Line 5, in Claim 17, delete "to" and insert -- to: --, therefor.

In Column 14, Line 26, in Claim 32, delete "non-transitory A" and insert -- A non-transitory --, therefor.

Signed and Sealed this
Eighteenth Day of December, 2012

David J. Kappos
*Director of the United States Patent and Trademark Office*